United States Patent
Lee et al.

(10) Patent No.: US 9,667,399 B2
(45) Date of Patent: May 30, 2017

(54) METHOD OF DETECTING CONTROL INFORMATION IN WIRELESS COMMUNICATION SYSTEM, AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/437,410

(22) PCT Filed: Nov. 6, 2013

(86) PCT No.: PCT/KR2013/010019
§ 371 (c)(1),
(2) Date: Apr. 21, 2015

(87) PCT Pub. No.: WO2014/073856
PCT Pub. Date: May 15, 2014

(65) Prior Publication Data
US 2015/0280882 A1     Oct. 1, 2015

Related U.S. Application Data

(60) Provisional application No. 61/723,301, filed on Nov. 6, 2012.

(51) Int. Cl.
*H04L 5/00* (2006.01)
*H04W 72/04* (2009.01)
(Continued)

(52) U.S. Cl.
CPC .............. *H04L 5/0053* (2013.01); *H04L 1/18* (2013.01); *H04W 72/0453* (2013.01); *H04W 72/1289* (2013.01)

(58) Field of Classification Search
None
See application file for complete search history.

(56) References Cited

U.S. PATENT DOCUMENTS 8,520,621 B2 * 8/2013 Tee ................... H04L 5/001
                                                370/329
9,100,156 B2 * 8/2015 Ahn
(Continued)

FOREIGN PATENT DOCUMENTS

KR   10-2010-0114852 A    10/2010
KR   WO 2011090289 A2 *  7/2011   .......... H04L 1/1861
(Continued)

*Primary Examiner* — Tejis Daya
(74) *Attorney, Agent, or Firm* — Birch, Stewart, Kolasch & Birch, LLP

(57) ABSTRACT

The present invention relates to a method and apparatus for receiving, by a terminal, control information in a wireless communication system supporting a carrier aggregation system. In detail, the method includes a step of receiving control information on a specific subframe through a first carrier and second carrier, wherein, when the control channel type on the first carrier and the control channel type on the second carrier are different from each other in the specific subframe, the control information is received according to the control channel type on one carrier of either the first carrier or second carrier corresponding to predefined monitoring information.

12 Claims, 11 Drawing Sheets

(51) Int. Cl.
*H04L 1/18* (2006.01)
*H04W 72/12* (2009.01)

(56) References Cited

U.S. PATENT DOCUMENTS

| | | | |
|---|---|---|---|
| 2010/0322173 A1 | 12/2010 | Marinier et al. | |
| 2011/0274066 A1* | 11/2011 | Tee | H04L 5/001 370/329 |
| 2012/0039180 A1* | 2/2012 | Kim | H04L 5/0053 370/241 |
| 2012/0294248 A1 | 11/2012 | Seo et al. | |
| 2012/0307689 A1* | 12/2012 | Kim | H04L 1/1861 370/280 |
| 2012/0327783 A1* | 12/2012 | Moon | H04L 1/1861 370/241 |
| 2013/0058240 A1* | 3/2013 | Kim | H04L 5/0007 370/252 |
| 2013/0077523 A1 | 3/2013 | Ko et al. | |
| 2014/0036747 A1* | 2/2014 | Nory | H04W 72/0406 370/311 |

FOREIGN PATENT DOCUMENTS

| | | |
|---|---|---|
| WO | WO2010/120142 A2 * | 10/2010 |
| WO | WO 2010/120142 A2 | 10/2010 |
| WO | WO2011/002218 * | 1/2011 |
| WO | WO 2011/074868 A1 | 6/2011 |
| WO | WO2011/126329 A2 * | 10/2011 |
| WO | WO 2011/155777 A2 | 12/2011 |

* cited by examiner

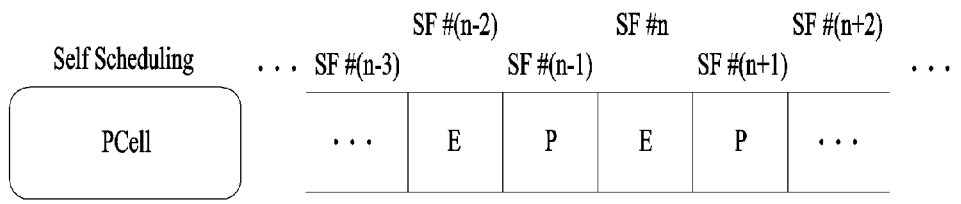
FIG. 12A
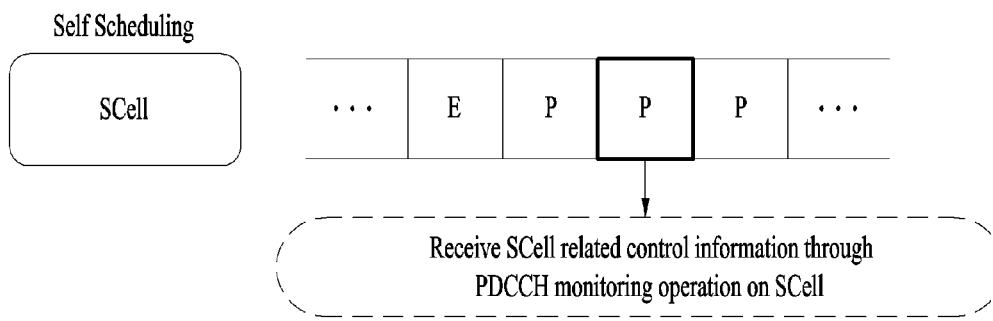
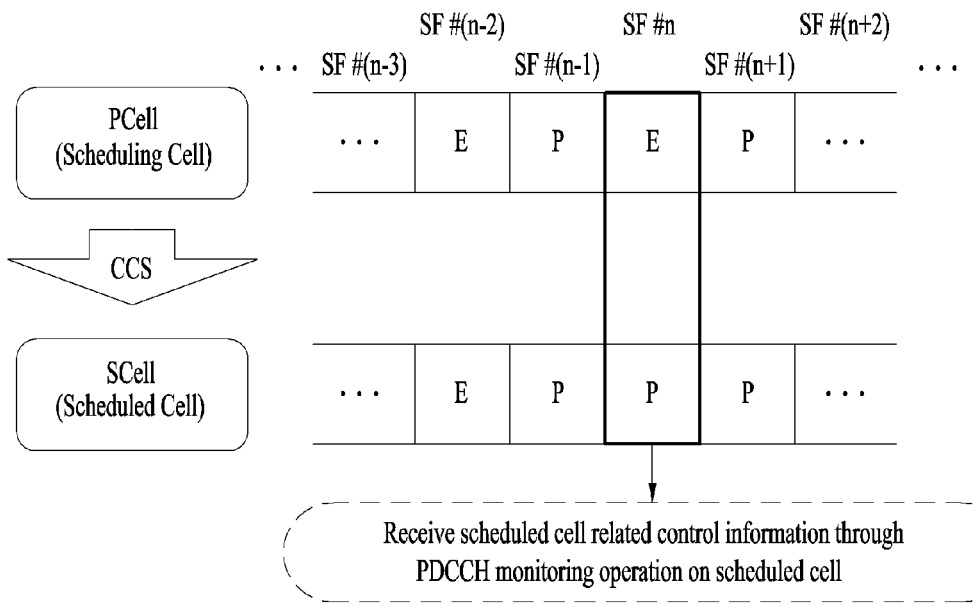
FIG. 12B

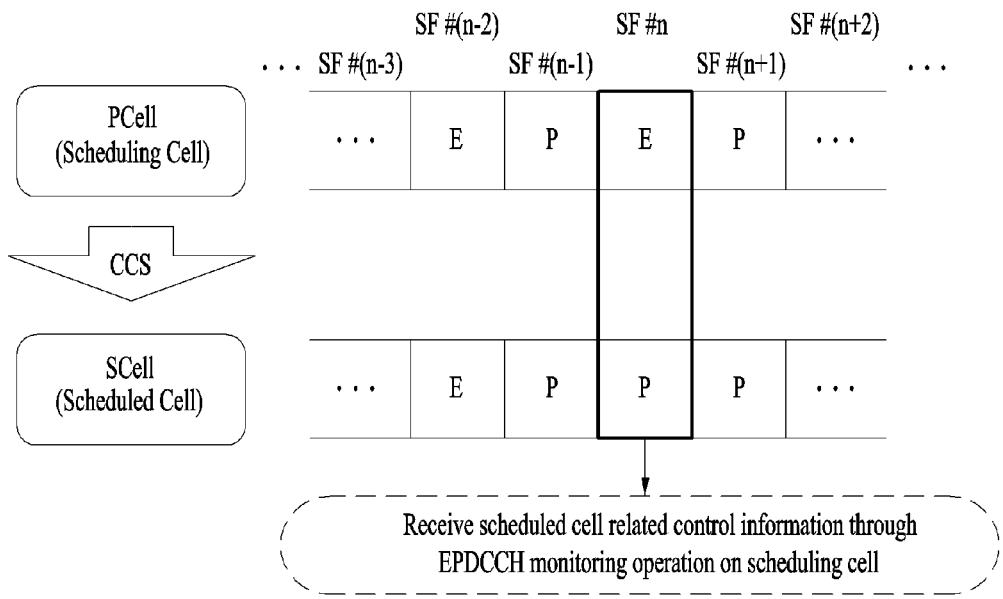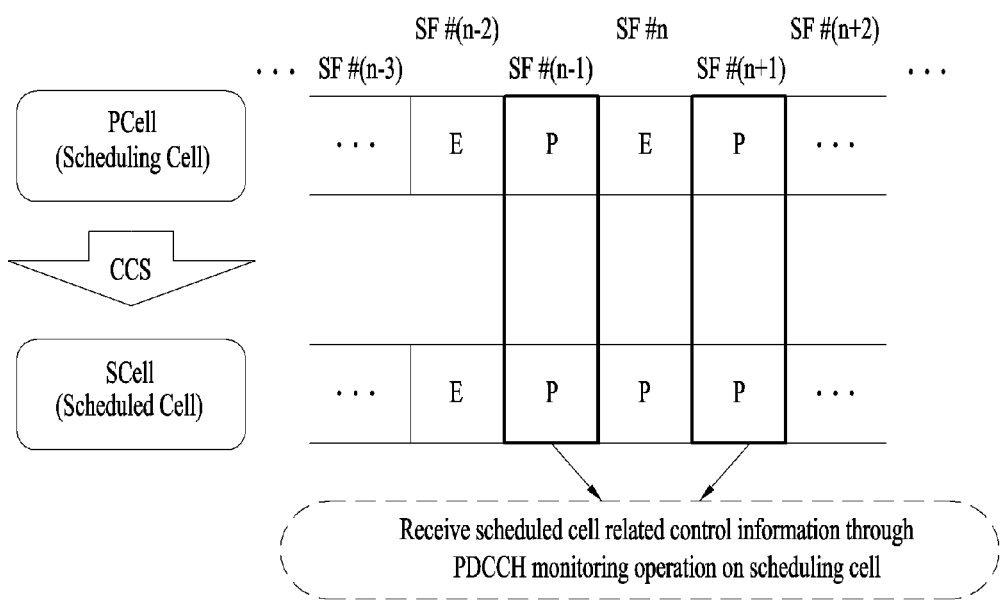

METHOD OF DETECTING CONTROL INFORMATION IN WIRELESS COMMUNICATION SYSTEM, AND APPARATUS FOR SAME

CROSS REFERENCE TO RELATED APPLICATIONS

This application is the National Phase of PCT International Application No. PCT/KR2013/010019, filed on Nov. 6, 2013, which claims priority under 35 U.S.C. 119(e) to U.S. Provisional Application No. 61/723,301, filed on Nov. 6, 2012, all of which are hereby expressly incorporated by reference into the present application.

TECHNICAL FIELD

The present invention relates to a wireless communication system, and more particularly, to a method of detecting a control information in a wireless communication system and apparatus therefor.

BACKGROUND ART

A 3rd Generation Partnership Project Long Term Evolution (3GPP LTE) communication system will be described as an exemplary wireless communication system to which the present invention can be applied.

FIG. 1 is a schematic view illustrating an Evolved Universal Mobile Telecommunications System (E-UMTS) network configuration as an exemplary wireless communication system. E-UMTS is an evolution of the legacy UMTS. E-UMTS is under basic standardization in the 3GPP. In general, it can be said that E-UMTS is an LTE system. For details of the UMTS and E-UMTS technical specifications, refer to Release 7 and Release 8 in "3rd Generation Partnership Project; Technical Specification Group Radio Access Network".

Referring to FIG. 1, the E-UMTS system includes a User Equipment (UE), evolved Node Bs (eNode Bs or eNBs), and an Access Gateway (AG) which is located at an end of the network (E-UTRAN), connected to an external network. An eNode B can simultaneously transmit multiple data streams for broadcast service, multicast service and/or unicast service.

A single eNode B manages one or more cells. A cell is set to operate in one of the bandwidths of 1.44, 3, 5, 10, 15, and 20 Mhz and provides downlink or uplink transmission service to a plurality of UEs. Different cells may be set to provide different bandwidths. The eNode B controls data transmission and reception to and from a plurality of UEs. Regarding DownLink (DL) data, the eNode B signals information about a time/frequency area, coding scheme, data size, Hybrid Automatic Repeat and reQuest (HARQ) information, etc. for data transmission to a UE by DL scheduling information. Regarding UpLink (UL) data, the eNode B signals information about a time/frequency area, coding scheme, data size, Hybrid Automatic Repeat and reQuest (HARQ) information, etc. available to the UE by UL scheduling information. An interface for transmitting user traffic or control traffic may be used between eNode Bs. A Core Network (CN) may be configured with an AG and a network node for performing user registration of a UE. The AG manages the mobility of UEs on a Tracking Area (TA) basis. A TA is composed of a plurality of cells.

Although wireless communication technology has reached the developmental stage of LTE based on Wideband Code Division Multiple Access (WCDMA), demands and expectations of users and service providers are ever increasing. Considering that other radio access technologies are being developed, new technological evolutions are required to achieve future competitiveness. There exists a need for reduction of cost per bit, increase of service availability, flexible use of frequency bands, simplified structures and open interfaces, and appropriate power consumption of UEs.

DISCLOSURE OF THE INVENTION

Technical Task

The technical task of the present invention is to provide a method of detecting a control information in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these objects and other advantages and in accordance with the purpose of the invention, as embodied and broadly described herein, a method of receiving a control information in a user equipment of a wireless communication system supportive of a carrier aggregation system according to one embodiment of the present invention includes the step of receiving the control information in a specific subframe through a first carrier and a second carrier, wherein if a control channel type on the first carrier is different from that on the second carrier in the specific subframe, the control information is received in accordance with the control channel type on either the first carrier or the second carrier corresponding to a predefined monitoring information.

Preferably, a set of subframes for monitoring a control channel of a first control channel type on the first carrier is configured to include a set of subframes for monitoring a control channel of a first control channel type on the second carrier.

Preferably, if the control channel type of the first carrier is equal to that of the second carrier, the monitoring information indicates that the second carrier is cross-carrier scheduled by the first carrier.

Preferably, if the control channel type of the first carrier is different from that of the second carrier, the monitoring information indicates that each of the first carrier and the second carrier is self-scheduled.

Preferably, the second carrier is configured in a manner that a downlink HARQ set differently in accordance with a type of a control channel for receiving the monitoring information is applied.

Preferably, the second carrier is configured in a manner that a predefined downlink HARQ is applied.

Preferably, the second carrier is configured in a manner that an uplink HARQ set differently in accordance with a type of a control channel for receiving the monitoring information is applied.

Preferably, the second carrier is configured in a manner that a predefined uplink HARQ is applied.

Preferably, the control channel type includes one of an enhanced physical downlink control channel (EPDCCH) and a physical downlink control channel (PDCCH).

In another aspect of the present invention, as embodied and broadly described herein, in receiving a control information in a wireless communication system supportive of a carrier aggregation system, a user equipment according to another embodiment of the present invention includes a radio frequency unit and a processor configured to receive the control information in a specific subframe through a first carrier and a second carrier, wherein if a control channel type on the first carrier is different from that on the second carrier in the specific subframe, the control information is received in accordance with the control channel type on either the first carrier or the second carrier corresponding to a predefined monitoring information.

Advantageous Effects

According to the present invention, downlink control information of a user equipment can be effectively detected in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 12 shows various embodiments proposed by the present invention.

BEST MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

Figure 1:
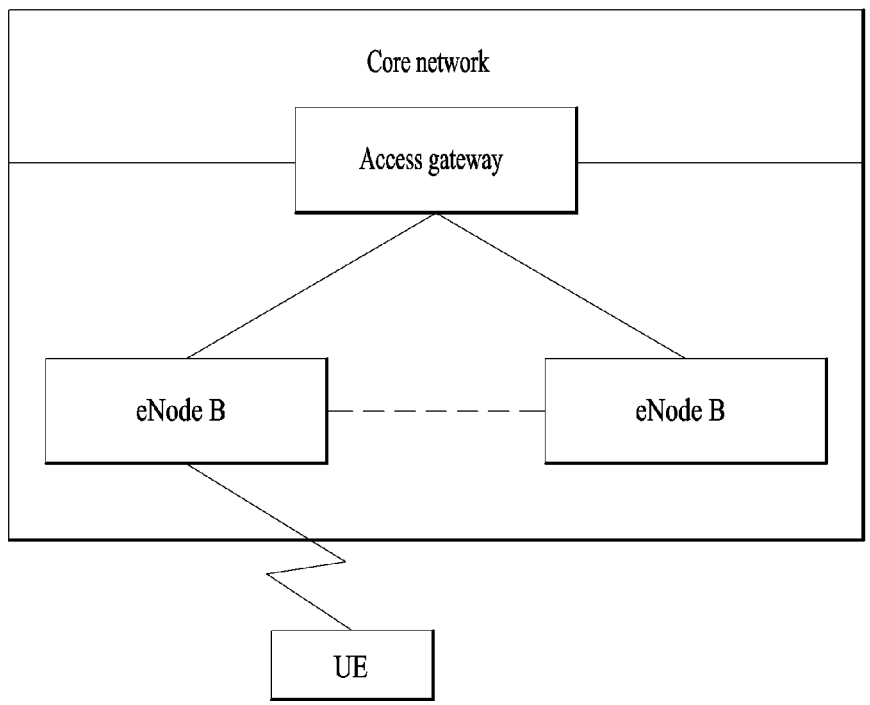
FIG. 1 shows a structure of E-UMTS network as one example of a wireless communication system.
Figure 2:
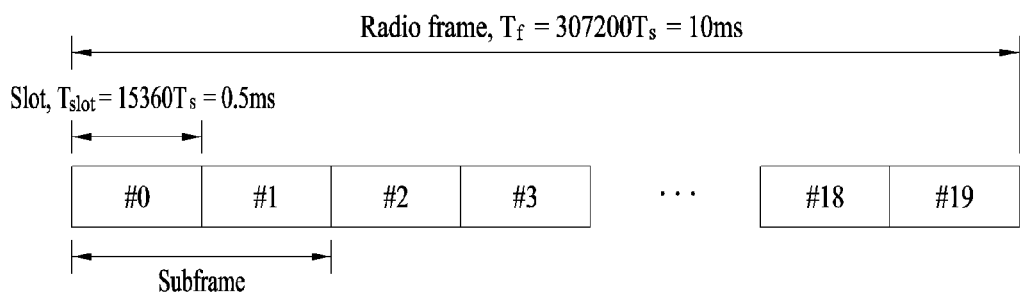
FIG. 2 shows one example of a configuration of a radio frame of 3GPP system.

FIG. 2 is a diagram for an example of a radio frame structure of 3GPP system.

Referring to FIG. 2, A radio frame includes 10 subframes. Each of the subframes includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols or SC-FDMA (single carrier frequency division multiple access) symbol in time domain. Since 3GPP LTE system uses OFDMA in downlink and SC-FDMA in uplink, OFDM or SC-FDMA symbol indicates one symbol period. Resource block (RB) is a resource allocation unit and may include a plurality of contiguous subcarriers in one slot. The above-described structures of the radio frame are exemplary only. And, the number of subframes included in a radio frame, the number of slots included in the subframe and the number of symbols included in the slot may be modified in various ways.

Figure 3:
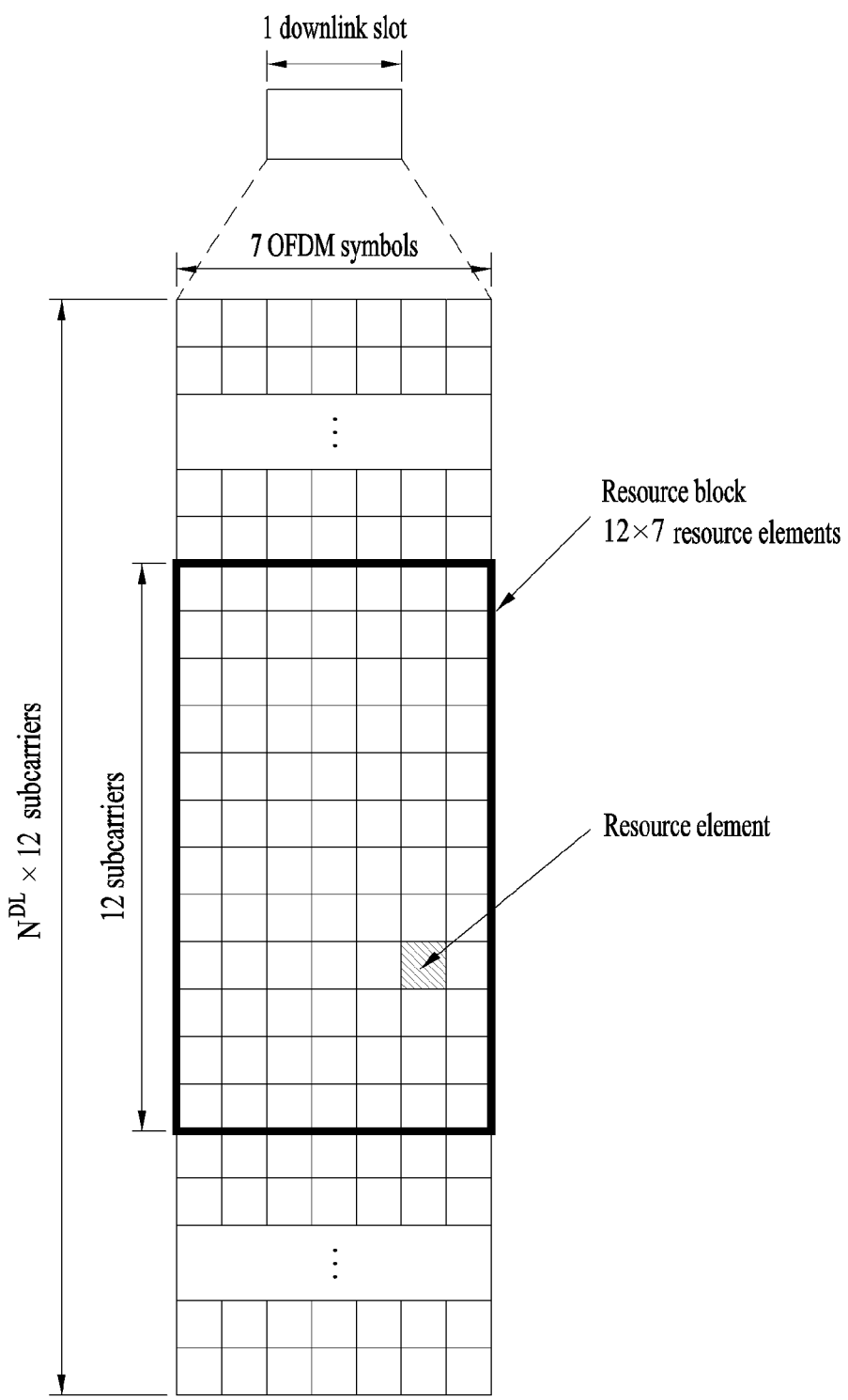
FIG. 3 shows one example of a resource grid of a downlink slot.

FIG. 3 is a diagram for an example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NDL of resource blocks included in a DL slot may depend on a DL transmission bandwidth. And, the structure of an uplink (UL) slot may be identical to that of the DL slot and OFDM symbol is replaced by SC-FDMA symbol.

Figure 4:
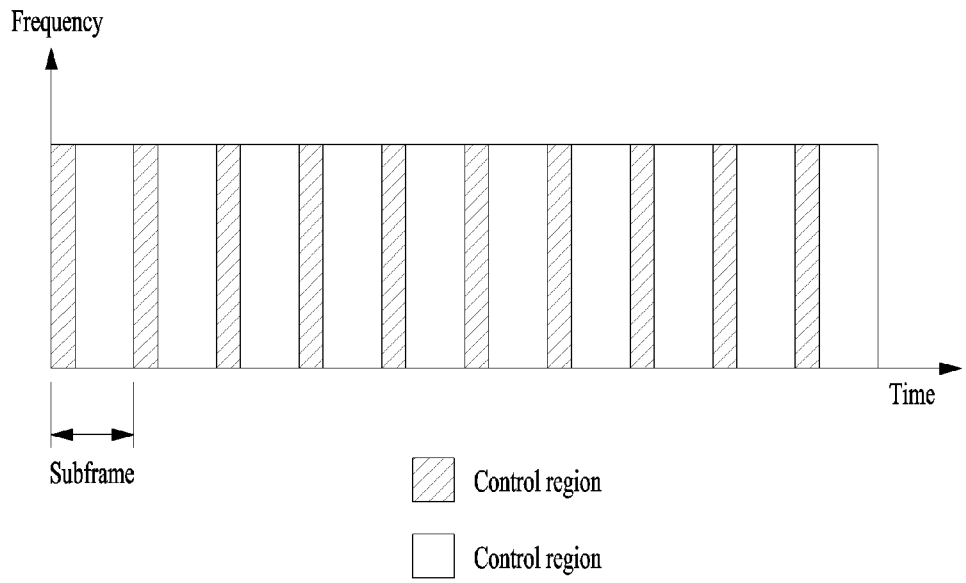
FIG. 4 shows one example of a configuration of a downlink frame.

FIG. 4 shows one example of a configuration of a downlink frame.

Referring to FIG. 4, maximum 3 (4) OFDM symbols situated in a head part of a first slot of a subframe correspond to a control region to which control channels are assigned. The rest of OFDM symbols correspond to a data region to which PDSCH (physical downlink shared channel) is assigned. Examples of DL (downlink) control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries HARQ ACK/NACK (acknowledgement/negative-acknowledgement) signal in response to UL (uplink) transmission.

Control information carried on PDCCH may be called a downlink control information (hereinafter abbreviated DCI). The DCI may include a resource allocation information for a user equipment or a user equipment group and other control informations. For instance, the DCI includes UL/DL scheduling information, UL transmission (Tx) power control command, power control command, and the like.

Control information carried on PDCCH may be named DCI (downlink control information). For UL DCI formats, formats 0, 3, 3A, 4 and the like are defined. For DL DCI formats, formats 1, 1A, 1B, 1C, 1D, 2, 2A, 2B, 2C and the like are defined. Depending on the DCI format, a type of an information field, the number of information fields, the number of bits of each information field and the like are changed. For instance, in accordance with a usage, the DCI format selectively includes such information as a hopping flag, an RB assignment, an MCS (modulation coding scheme), an RV (redundancy version), an NDI (new data indicator), a TPC (transmit power control), an HARQ process number, a PMI (precoding matrix indicator) confirmation and the like. Hence, a size of a control information matching a DCI format is changed in accordance with the DCI format. Meanwhile, a random DCI format is usable for at least two types of control information transmissions. For instance, DCI format 0/1A is used to carry DCI format 0 or DCI format 1, which are distinguished from each other by flag fields.

PDCCH carries a transmission format and resource allocation of DL-SCH (downlink shared channel), a resource allocation information on UL-SCH (uplink shared channel), a paging information on PCH (paging channel), a system information on DL-SCH, a resource allocation information such as a random access response transmitted on PDSCH, a transmission power control command for an individual user equipment in a random user equipment (UE) group, an activation of VoIP (voice over IP) and the like. A plurality of PDCCHs can be transmitted within a control region. A user equipment is able to monitor a plurality of the PDCCHs. PDCCH is transmitted on a single CCE (control channel element) or an aggregation of a plurality of consecutive CCEs. The CCE is a logical assignment unit used to provide PDCCH of a prescribed coding rate in accordance with a state of a radio channel. The CCE corresponds to a plurality of REGs (resource element group). A format of PDCCH and the bit number of available PDCCH are determined in accordance with a correlation between the number of CCEs and a coding rate provided by CCE. A base station determined a PDCCH format depending on a DCI which is to be transmitted to a user equipment and attaches a CRC (cyclic redundancy check) to a control information. The CRC is masked with a unique identifier (RNTI (radio network temporary identifier) in accordance with an owner or usage of PDCCH. If PDCCH is provided for a specific user equipment, a unique identifier (e.g., C-RNTI (cell-RNTI)) of the corresponding user equipment is masked on a CRC. For another instance, if PDCCH is provided for a paging message, a paging indication identifier (e.g., P-RNTI (paging-RNTI)) is masked on a CRC. If PDCCH relates to a system information (more particularly, SIB (system information block) mentioned in the following description), a system information identifier (e.g., SI-RNTI (system information-RNTI) is masked on a CRC. In order to indicate a random access response in response to a transmission of a random access preamble of a user equipment, an RA-RNTI (random access-RNTI) is masked on a CRC.

PDCCH carries a message known as a DCI (downlink control information). The DCI contains a resource allocation for a single user equipment or a user equipment group and other control informations. In general, a plurality of PDCCHs can be transmitted in a single subframe. Each PDCCH is transmitted using at least one CCE (control channel element) and each CCE corresponds to 4 resource elements of 9 sets. The 4 resource elements are called REG (resource element group). 4 QPSK symbols are mapped to a single REG. A resource element assigned to a reference signal is not included in REG. Hence, the total number of REGs within a given OFDM symbol varies depending on a presence or non-presence of a cell-specific reference signal. The REG concept (i.e., a group unit mapping, each group including 4 resource elements) is used for other downlink control channels (PCFICH, PHICH). In particular, REG is used as a basic resource unit of a control region. 4 PDCCH formats are supported as listed in Table 1.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are consecutively used in a manner of being numbered. In order to simplify a decoding process, PDCCH having a format configured with n CCEs can start with a CCE having the number corresponding to a multiple of n only. The number of CCEs used for a transmission of a specific PDCCH is determined by a base station in accordance with a channel state. For instance, a single CCE may be enough for a case of a PDCCH for a user equipment having a good downlink channel. Yet, in case of a PDCCH for a user equipment having a poor channel (e.g., a user equipment located nearby a cell edge), 8 CCEs may be requested to obtain sufficient robustness. Moreover, a power level of PDCCH can be adjusted to cope with a channel state.

LTE defines a CCE set at which PDCCH can be located for each user equipment. A CCE set from which a user equipment can discover its PDCCH is called a PDCCH search space, and briefly, a search space (SS). An individual resource capable of carrying PDCCH in SS is called a PDCCH candidate. One PDCCH candidate corresponds to 1, 2, 4, or 8 CCEs in accordance with a CCE aggregation level. A base station actually transmits a PDCCH (DCI) on a random PDCCH candidate in SS, while a user equipment monitors the SS to find the PDCCH (DCI). In particular, the user equipment attempts a blind decoding (BD) on PDCCH candidates in the SS.

In LTE, a size of an SS is given in accordance with a PDCCH format. And, a USS (UE-specific search space) and a CSS (common search space) are separately defined. The USS may be called a dedicated search space. The USS is individually set for each user equipment and a CSS range is known to all user equipments. The USS and CSS may overlap each other for a given user equipment. In case that all CCEs are already assigned to another user equipment in a USS for a specific user equipment, since there are no CCEs left, a base station may not find CCE resources to carry PDCCH to the specific user equipment from a corresponding subframe. In order to minimize a possibility that the above blocking may continue to a next subframe, a US start position is changed in each subframe by a UE-specific hopping sequence. Table 2 shows sizes of CSS and USS.

TABLE 2

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to control an operation overhead in accordance with a blind decoding attempt, a user equipment does not search all the defined DCI formats simultaneously. Generally, a user equipment always searches a USS for a format 0 and a format 1A. Each of the format 0 and the format 1A has the same size but is identified by a flag in a message. Moreover, the user equipment may be requested to receive another format (i.e., a format 1, a format 1B or a format 2 in accordance with a PDSCH transmission mode set by a base station) in addition. A user equipment searches a CSS for a format 1A and a format 1C. and, the user equipment may be configured to search for a format 3 or a format 3A. The format 3/3A has the same size like the case of the format 0/1A and is identified depending on whether to have a CRC scrambled with a different (common) identifier. Transmission modes and contents of DCI format for configuring a multi-antenna technology are described as follows.

Transmission Mode
Transmission Mode 1: Transmission from a single base station antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Transmission using UE-specific reference signals
DCI Formats
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g., paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments
FIG. 5 is a flowchart for configuring PDCCH (physical downlink control channel) in a base station.

Figure 5:
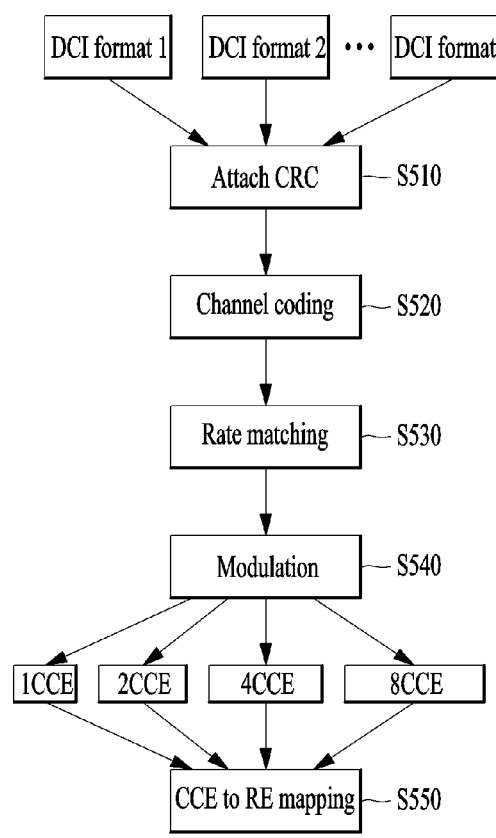
FIG. 5 is a flowchart for configuring PDCCH (physical downlink control channel) in a base station.

Referring to FIG. 5, a base station creates a control information in accordance with a DCI format. The base station can select a prescribed DCI format from a plurality of DCI formats (e.g., DCI formats 1 to N) in accordance with the control information to be sent by the base station to a user equipment. In a step S510, a CRC (cyclic redundancy check) for error detection is attached to the control information created in accordance with each DCI format. The CRC is masked with an identifier (e.g., RNTI (radio network temporary identifier)) in accordance with an owner or usage of PDCCH. So to speak, the PDCCH is CRC-scrambled with an identifier (e.g., RNTI).

Table 3 shows examples of identifiers masked on PDCCH.

TABLE 3

| Type | Identifier | Description |
|---|---|---|
| UE-specific | C-RNTI, temporary C-RNTI, semi-persistent C- | used for a unique UE identification |
| Common | P-RNTI | used for paging message |
| | SI-RNTI | used for system information |
| | RA-RNTI | used for random access response |

If C-RNTI, temporary C-RNTI or SPS (semi-persistent scheduling) C-RNTI is used, PDCCH carries a control information for a corresponding specific user equipment. If an RNTI other than the above-mentioned RNTIs is used, PDCCH carries a common control information received by all user equipments in a cell. In a step S530, a coded data (i.e., codeword) is created by performing a channel coding on the CRC attached control information. In a step S530, a transmission rate matching in accordance with a CCE aggregation level assigned to a PDCCH format is performed. In a step S540, modulated symbols are generated by modulating the coded data (codeword). The modulated symbols configuring one PDCCH may have the CCE aggregation level corresponding to one of 1, 2, 4 and 8. In a step S550, the modulated symbols are mapped to a physical resource element (RE) [i.e., CCE to RE mapping].

Figure 6:
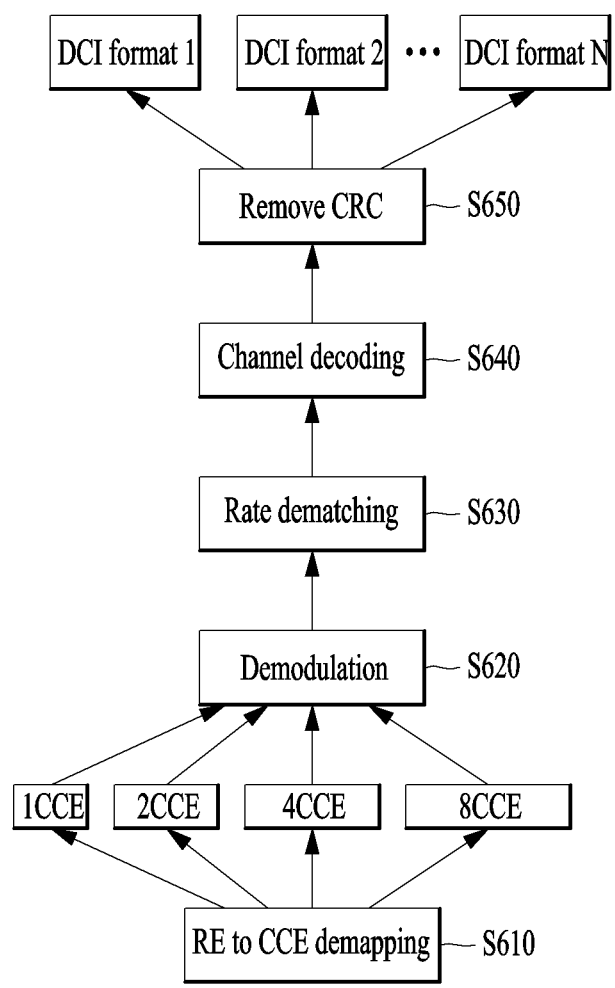
FIG. 6 shows one example of a process for PDCCH reception in a user equipment.

FIG. 6 shows one example of a process for PDCCH reception in a user equipment.

Referring to FIG. 6, in a step S610, a user equipment demaps a physical resource element into a CCE [i.e., CCE to RE demapping]. In a step S620, since the user equipment fails to know a prescribed CCE aggregation level at which the user equipment should receive PDCCH, the user equipment performs demodulation for each CCE aggregation level. In a step S630, the user equipment performs a transmission rate dematching on the demodulated data. Since the user equipment fails to know that the user equipment should receive a control information having a prescribed DCI format (or a DCI payload size), the user equipment performs the transmission rate dematching on each DCI format (or DCI payload size). In a step S640, the user equipment performs a channel decoding on the rate-dematched data in accordance with a coding rate and then detects a presence or non-presence of error occurrence by checking a CRC. If an error occurs, the user equipment continues to perform the blind decoding on other CCE aggregation levels or other DCI formats (or DCI payload sizes). In a step S650, having detected the PDCCH of its own, the user equipment removes the CRC from the decoded data and acquires the control information.

A plurality of PDCCHs for a plurality of user equipments can be transmitted in a control region of the same subframe.

A base station does not provide the user equipment with an information indicating where the corresponding PDCCH is located in the control region. Hence, the user equipment searches for its PDCCH by monitoring a set of PDCCH candidates in the subframe. In doing so, the monitoring includes an attempt (hereinafter, named a blind detection, BD) to decode each of the PDCCH candidates in accordance with a DCI format and a CCE aggregation level. Through the BD, the user equipment simultaneously performs identification of the PDCCH transmitted to the corresponding user equipment and decoding of the control information transmitted on the corresponding PDCCH. For instance, when a PDCCH is demasked with C-RNTI, if there is no CRC error, it means that the user equipment has detected its PDCCH.

Meanwhile, in order to reduce a BD overhead, the number of DCI formats is defined to be smaller than the types of control informations transmitted suing PDCCH. A DCI format includes a plurality of different information fields. Depending of a DCI format, a type of an information field, the number of information fields, the number of bits of each information field and the like are changed. Moreover, a size of a control information matching a DCI format varies in accordance with the DCI format. A random DCI format is usable for control information transmissions of at least two types.

Table 4 shows one example of control information transmitted by DCI format 0. In the following, a bit size of each information field is just exemplary but does not limit a bit size of a field.

TABLE 4

| | Information Field | bit(s) |
|---|---|---|
| (1) | Flag for format0/format1A differentiation | 1 |
| (2) | Hopping flag | 1 |
| (3) | Resource block assignment and hopping resource Allocation | $\lceil \log_2(N_{RB}^{UL}(N_{RB}^{UL} + 1)/2) \rceil$ |
| (4) | Modulation and coding scheme and redundancy Version | 5 |
| (5) | New data indicator | 1 |
| (6) | TPC command for scheduled PUSCH | 2 |
| (7) | Cyclic shift for DM RS | 3 |
| (8) | UL index (TDD) | 2 |
| (9) | CQI request | 1 |

A flag field is an information field for the differentiation between format 0 and format 1A. In particular, the DCI format 0 and the DCI format 1A have the same payload size but are differentiated from each other by the flag field. A bit size of a resource block assignment & hopping resource allocation field may vary in accordance with a hoping PUSCH or a non-hopping PUSCH. The resource block assignment & hopping resource allocation field for the non-hopping PUSCH provides the ceiling [log$_2$ (NULRB (NULRB+1)/2)] bits to a resource allocation of a first slot in a UL subframe. In this case, the NULRB is the number of resource blocks included in a UL slot and depends on a UL transmission bandwidth set in a cell. Hence, a payload size of DCI format 0 may vary depending on a UL bandwidth. DCI format 1A includes an information field for PDSCH assignment and a payload size of DCI format 1A may vary depending on a DL bandwidth. The DCI format 1A provides a reference information bit size for the DCI format 0. Hence, if the number of information bits of the DCI format 0 is smaller than that of information bits of the DCI format 1A, '0' is added to the DCI format 0 until the payload size of the DCI format 0 becomes equal to that of the DCI format 1A. The added '0' is padded into a padding field of the DCI format.

Figure 7:
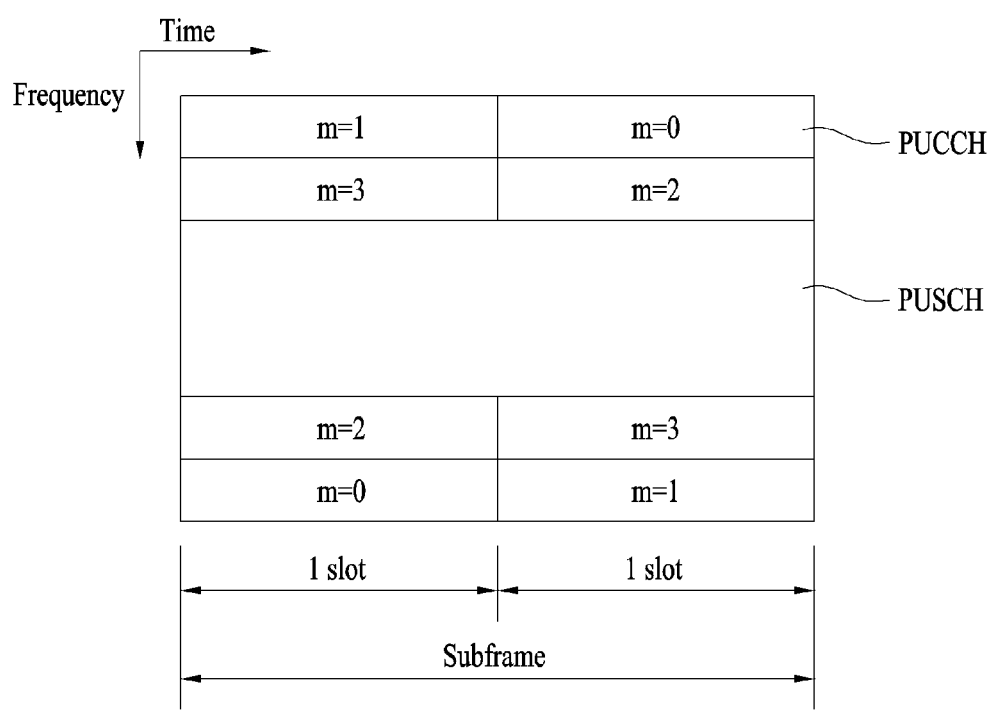
FIG. 7 shows one example of a configuration of an uplink subframe.

FIG. 7 shows one example of a configuration of an uplink subframe.

Referring to FIG. 7, a UL subframe includes a plurality of slots (e.g., 2 slots). Each of the slots may include SC-FDMA symbols of which number is different in accordance with a CP (cyclic prefix) length. For instance, a slot may include 7 SC-FDMA symbols in case of a normal CP. A UL subframe is divided into a data region and a control region in a frequency domain. The data region includes PUSCH and is used to transmit such a data signal as audio or the like. The control region includes PUCCH and is used to transmit a control information. The PUCCH includes an RB pair (e.g., m=0, 1, 2, 3) located at both ends of the data region and hops using a slot as a boundary. The control information includes HARQ ACK/NACK, CQI (Channel Quality Information), PMI (Precoding Matrix Indicator), RI (Rank Indication) and the like.

Figure 8:
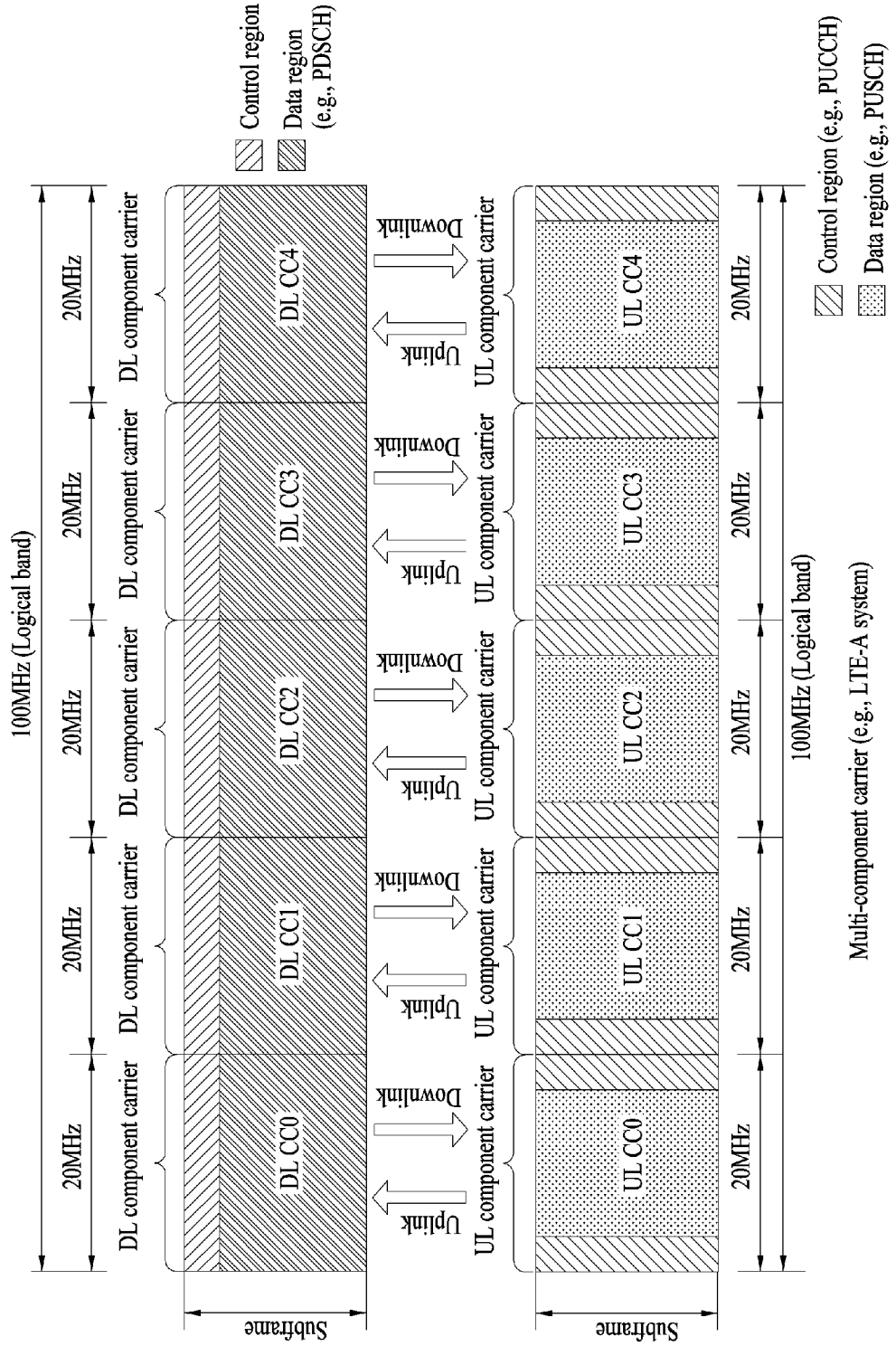
FIG. 8 shows one example of a carrier aggregation (CA) communication system.

FIG. 8 shows one example of a carrier aggregation (CA) communication system.

Referring to FIG. 8, a plurality of UL/DL CCs (uplink/downlink component carriers) are aggregated so as to support a wider UL/DL bandwidth. The terminology 'component carrier (CC)' can be substituted with another equivalent terminology (e.g., carrier, cell, etc.). The respective CCs may be adjacent or non-adjacent to each other in a frequency domain. A bandwidth of each of the component carriers may be determined independently. It is possible to configure asymmetric carrier aggregation in which the number of UL CCs is different from that of DL CCs. Meanwhile, a control information may be set to be transceived through a specific CC only. Such a specific CC may be named a primary CC (or an anchor CC), while other CCs may be named secondary CCs.

In case of applying a cross-carrier scheduling (or a cross-CC scheduling), a PDCCH for a DL assignment may be transmitted on DL CC #0 and a corresponding PDSCH may be transmitted on DL CC #2. For the cross-CC scheduling, it may be able to consider an introduction of a carrier indicator field (CIF). A presence or non-presence of a CIF in PDCCH can be set by an upper layer signaling (e.g., RRC signaling) in a semi-static manner of a UE-specific (or UE group-specific) manner. A baseline of PDCCH transmission is summarized as follows.

CIF disabled: PDCCH on DL CC allocates PDSCH resource on the same DL CC or PUSCH resource on a linked UL CC.
    No CIF
    Same as LTE PDCCH structure (same coding, same CCE-based resource mapping) and DCI format
    CIF enabled: PDCCH on DL CC can allocate PDSCH or PUSCH resource on a specific DL/UL CC among a plurality of aggregated DL/UL CCs using CIF.
    Extended LTE DCI format having CIF
        CIF (enabled) corresponds to a fixed x-bit field (e.g., x=3)
        CIF (enabled) location is fixed irrespective of DCI format size
            Reuse LTE PDCCH structure (same coding, same CC-based resource mapping)

If a CIF is present, a base station is able to assign a PDCCH monitoring DL CC set to lower BD complexity of a user equipment side. The PDCCH monitoring DL CC set includes at least one DL CC as apportion of full DL CCs and a user equipment performs detection/decoding of PDCCH on the corresponding DL CC only. In particular, in case that a base station schedules PDSCH/PUSCH for a user equipment, the PDCCH is transmitted on a PDCCH monitoring DL CC set only. The PDCCH monitoring DL CC set can be configured in a UE-specific manner, a UE-group-specific manner, or a cell-specific manner. The terminology 'PDCCH monitoring DL CC set' can be substituted with such an equivalent terminology as a monitoring carrier, a monitoring cell or the like. Moreover, a CC aggregated for a user equipment can be substituted with such an equivalent terminology as a serving CC, a serving carrier, a serving cell or the like.

Figure 9:
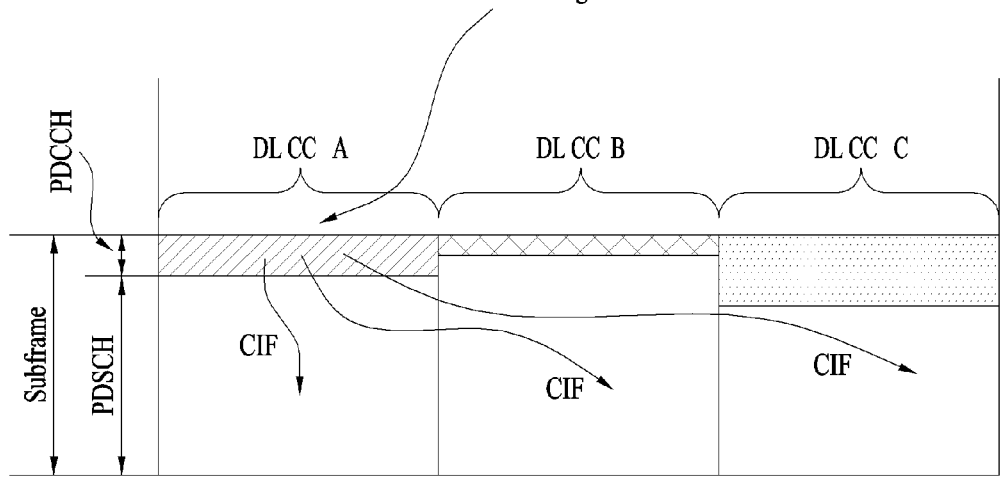
FIG. 9 shows one example of a scheduling in case of aggregating a plurality of carriers.

FIG. 9 shows one example of a scheduling in case of aggregating a plurality of carriers. Assume that 3 DL CCs are aggregated. Assume that DL CC A is configured as a PDCCH monitoring DL CC. DL CC A-C may be called a serving CC, a serving carrier, a serving cell, or the like. If a CIF is disabled, each DL CC can transmit only a PDCCH for scheduling its PDSCH without CIF in accordance with LTE PDCCH configuration. On the other hand, if a CIF is enabled by a UE-specific (or, UE-group-specific, cell-specific) upper layer signaling, DL CC A (i.e., a monitoring DL CC) can transmit not only a PDCCH for scheduling a PDSCH of DL CC A but also a PDCCH for scheduling a PDSCH of another CC using the CIF. In this case, a PDCCH is not transmitted on DL CC B/C failing to be set as a PDCCH monitoring DL CC. Hence, the DL CC A (i.e., the monitoring DL CC) should include a PDCCH search space related to the DL CC A, a PDCCH search space related to the DL CC B and a PDCCH search space related to the DL CC C all. In the present specification, assume that a PDCCH search space is defined for each carrier.

As mentioned in the foregoing description, LTE-A currently considers using a CIF within PDCCH for cross-CC scheduling. A presence or non-presence of a use of a CIF (i.e., a support of a cross-CC scheduling mode or a non-cross-CC scheduling mode) and an inter-mode switching may be configured semi-statically/UE-specifically through an RRC signaling. After a user equipment has gone through the corresponding RRC signaling, the user equipment is able to recognize whether a CIF is used within a PDCCH that will be scheduled for the corresponding user equipment.

Figure 10:
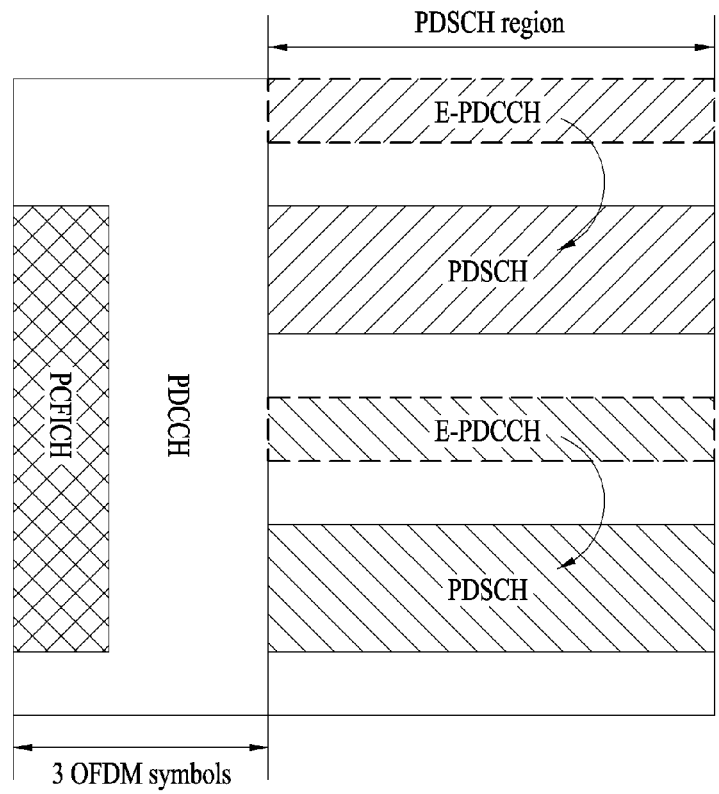
FIG. 10 shows one example of EPDCCH and PDSCH scheduled by EPDCCH.

FIG. 10 shows one example of EPDCCH and PDSCH scheduled by EPDCCH.

Referring to FIG. 10, an EPDCCH is able to define and use a portion of a PDSCH region for transmitting data in general. And, a user equipment should perform a blind decoding process for detecting a presence or non-presence of its EPDCCH. Although the EPDCCH performs the same scheduling operation (i.e., PDSCH/PUSCH control) of an existing legacy PDCCH, if the number of user equipments currently accessing such a node as RRH increases, a great number of EPDCCHs are assigned within a PRSCH region to increase a count of blind decodings the user equipment should perform. Hence, it is disadvantageous in that complexity may increase.

The present invention proposes an efficient EPDCCH/PDCCH based control information receiving operation method (of a user equipment) in an environment in which an enhanced DL control channel (enhanced PDCCH (EPDCCH)) corresponding to a control channel transmitted in an existing PDSCH (hereinafter called a legacy PDSCH) region on behalf of an existing PDCCH (hereinafter called a legacy PDCCH).

According to the present invention, a PDSCH region means a region configured with the rest of OFDM symbols except initial OFDM symbols used for the usage of a legacy PDCCH transmission in a subframe (hereinafter abbreviated SF) configured with a multitude of OFDM symbols. Since any OFDM symbol used for the usage of a PDCCH transmission does not exist, all OFDM symbols of a corresponding SF can be designated and used as a PDSCH region. Moreover, it is apparent that E-PDCCH mentioned in the following description can be used for a relay to perform a communication with a base station as well as for a general user equipment.

For clarity of the following description, a proposed method is explained based on 3GPP LTE system. Yet, it is apparent that the scope of the system to which an embodiment of the present invention is applied is extensible to systems of other features as well as to the 3GPP LTE system.

According to the present invention, proposed is an efficient control information reception operation method based on EPDCCH/PDCCH of a base station and a user equipment in CA (carrier aggregation) applied environment.

Embodiments of the present invention may be extensively applicable in an environment configured with at least one or more EPDCCH sets (particularly, one specific EPDCCH set may be configured with at least one or more PRB pairs) for EPDCCH transmission.

Moreover, in a carrier aggregation applied environment, embodiments of the present invention are extensively applicable to a case that a multitude of EPDCCH sets monitored by a user equipment exist on different cells, a case that a multitude of EPDCCH sets are used for DL/UL data transmission on different cells, or a case that an EPDCCH or/and PDCCH based CCS method is set on a specific scheduling cell. Likewise, in a carrier aggregation applied environment, embodiments of the present invention are extensively applicable to a case that a multitude of EPDCCH sets monitored by a user equipment exist on different component carriers, a case that a multitude of EPDCCH sets are used for DL/UL data transmission on different component carriers, or a case that an EPDCCH or/and PDCCH based CCS method is set on a specific scheduling component carrier.

A proposed method of the present invention is extensively applicable to all cases of performing EPDCCH based control information transmitting/receiving operations in an environment that NCT (new carrier type) is used for carrier aggregation with a legacy cell or an environment that NCT is used independently without a (legacy DL) cell (i.e., an environment in which an NCT based initial access/random access operation process is performed). Likewise, a proposed method of the present invention is extensively applicable to all cases of performing EPDCCH based control information transmitting/receiving operations in an environment that NCT (new carrier type) is used for carrier aggregation with a legacy component carrier or an environment that NCT is used independently without a legacy (DL) component carrier (i.e., an environment in which an NCT based initial access/random access operation process is performed).

Moreover, embodiments of the present invention are extensively applicable to a case that different UL-DL subframe configurations are applied per cell or component carrier in a carrier aggregation applied environment.

Figure 11:
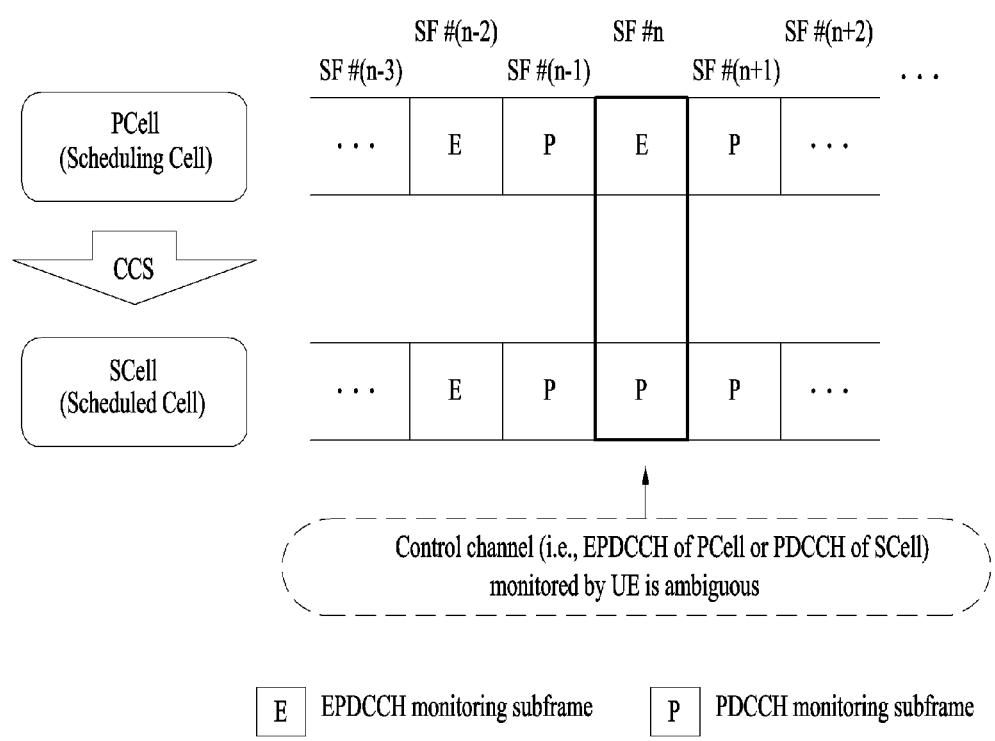
FIG. 11 shows one example of a case that a control channel to be monitored is ambiguous at a specific timing point in a carrier aggregation applied environment.

FIG. 11 shows a case that configurations for a timing point (e.g., subframe) of monitoring EPDCCH (or PDCCH) per cell or component carrier are not matched in a carrier aggregation applied environment.

Referring to FIG. 11, if configurations for a timing point (e.g., subframe) of monitoring EPDCCH (or PDCCH) per cell or component carrier are not matched in a carrier aggregation applied environment, ambiguity for a specific cell or component carrier related control information transmitting/receiving operation is generated at a specific subframe timing point (e.g., subframe) in aspects of a user equipment and a base station. In particular, in an environment that a carrier aggregation scheme and an (EPDCCH or/and PDCCH based) CCS method are applied, since configurations for a timing point (e.g., subframe) of monitoring EPDCCH or PDCCH per cell (or component carrier) are not matched, ambiguity for a CCS scheduled cell (or component carrier) (i.e., SCell) related control information transmitting/receiving operation is generated at a specific timing point (e.g., subframe).

In this case, assume a situation that two cells (i.e., PCell (primary Cell), SCell (Secondary Cell)) are carrier aggregated. In aspect of a user equipment, assume that a setting of not simultaneously monitoring USS (UE specific search space) of EPDCCH and USS of PDCCH at a specific timing point (e.g., subframe) and a setting of monitoring CSS (common search space) of PDCCH are applied to a user equipment. [Of course, the following assumptions are possible. First of all, two component carriers are carrier aggregated. Secondly, a setting for a user equipment not to monitor USS of EPDCCH and USS of PDCCH simultaneously at a specific timing point (e.g., subframe) and a setting for a user equipment to monitor CSS (common search space) of PDCCH are applied.

In this case (i.e., FIG. 11), at a timing point of subframe #n, it is necessary to clarify that a user equipment should receive a CSS scheduled cell (or component carrier) related control information based on which control channel type on a which cell (or component carrier) at the corresponding timing point due to the monitoring settings which are based on different control channel types for the corresponding cells (or component carriers), respectively.

Therefore, if the configurations for the timing points (subframes) of monitoring EPDCCH (or PDCCH) per cell are not matched in a carrier aggregation scheme (e.g., CCS or Self Scheduling (i.e., Non-CCS) method) applied environment, the present invention proposes the configurations of clearly stipulating a specific cell related control information transmitting/receiving operation at a specific timing point (e.g., subframe) [i.e., clarification of a control channel type (e.g., EPDCCH, PDCCH) for transmitting/receiving a specific cell related control information at a specific subframe timing point]. If the configurations for the timing points (subframes) of monitoring EPDCCH (or PDCCH) per component carrier are not matched in a carrier aggregation scheme (e.g., CCS or Self Scheduling (i.e., Non-CCS) method) applied environment, the present invention proposes the configurations of clearly stipulating a specific component carrier related control information transmitting/ receiving operation at a specific timing point (e.g., subframe) [i.e., clarification of a control channel type (e.g., EPDCCH, PDCCH) for transmitting/receiving a specific component carrier related control information at a specific subframe timing point]. According to the present invention, it is able to secure an efficient EPDCCH/PDCCH based control information receiving operation between a base station and a user equipment.

According to the present invention, if the settings for the timing points (e.g., subframes) of monitoring EPDCCH per cell (or component carrier) or the settings for the subframes of monitoring PDCCH are not matched in a carrier aggregation scheme applied environment, a base station and a user equipment can be set to transmit/receive a corresponding cell (or component carrier) related control information based on a predefined configuration at a timing point (subframe) at which EPDCCH on a specific cell (or component carrier) is not monitored. Moreover, according to the present invention, in the carrier aggregation applied environment, an information related to the configurations for the timing points (e.g., subframes) of monitoring EPDCCH (or PDCCH) per cell or component carrier or an information indicating whether to apply the configurations can be set to be notified to a user equipment by a base station through a predefined signal (e.g., a physical layer signal, an upper layer signal, etc.) or can be set to be implicitly obtained through a predefined configuration.

FIG. 12 is a reference diagram to describe embodiments to which the present invention is applicable. The embodiments shown in FIG. 12 are provided for clarity of the description only, by which the interpretation of the present invention is non-limited.

Referring to FIG. 12A, for one example, in case that carrier aggregation applied cells operate based on a self-scheduling method, a base station and a user equipment can be defined to receive a corresponding cell (i.e., SCell) related control information through a PDCCH (e.g., USS) monitoring operation on SCell at a timing point (e.g., subframe) at which EPDCCH on SCell (Secondary Cell) is not monitored. In case that carrier aggregation applied cells operate based on a self-scheduling method, a base station and a user equipment can be defined to receive a corresponding component carrier (i.e., secondary carrier) related control information through a PDCCH (e.g., USS) monitoring operation on SCell at a timing point (e.g., subframe) at which EPDCCH on a secondary carrier is not monitored.

For another example, referring to FIG. 12B, CSS operation is set between carrier aggregation applied cells (or component carriers), a scheduling cell is set as an EPDCCH based control channel monitoring subframe at a specific timing point (e.g., subframe), and a scheduled cell (e.g., SCell) is set as a PDCCH based control channel monitoring subframe. In this case, a base station and a user equipment can be defined to receive a corresponding cell (or component carrier) (i.e., SCell) related control information through a PDCCH (e.g., USS) monitoring operation on the scheduled cell (or component carrier) at a timing point (e.g., subframe) at which EPDCCH on the scheduled cell is not monitored [i.e., a sort of a self-scheduling method applied].

For another example, referring to FIG. 12C, a CSS operation is set between carrier aggregation applied cells (or component carriers), a scheduling cell is set as an EPDCCH based control channel monitoring subframe (i.e., a case that CIF (carrier indicator field) exists on the corresponding EPDCCH) at a specific timing point (e.g., subframe), and a scheduled cell (e.g., SCell) is set as a PDCCH based control channel monitoring subframe. In this case, a base station and a user equipment can be defined to receive a corresponding cell (or component carrier) related control information through an EPDCCH (e.g., USS) monitoring operation on a scheduling cell at a timing point (e.g., subframe) at which EPDCCH on the scheduled cell is not monitored [i.e., a sort of an EPDCCH based CCS method applied].

For further example, referring to FIG. 12D, a CSS operation is set between carrier aggregation applied cells (or component carriers) and both a scheduling cell and a scheduled cell (e.g., SCell) are set as PDCCH based control channel monitoring subframes at a specific timing point (e.g., subframe). In this case, a base station and a user equipment can be defined to receive a corresponding cell (or component carrier) related control information through a PDCCH (e.g., USS) monitoring operation on the scheduling cell at a timing point (e.g., subframe) at which EPDCCH on the scheduled cell is not monitored [i.e., a sort of a PDCCH based CCS method applied].

According to the present invention, a PDCCH monitoring subframe set per cell (or component carrier) can be configured in order for a PDCCH monitoring subframe set of a scheduling cell to include a PDCCH monitoring subframe set of a scheduled cell (e.g., SCell) in a carrier aggregation and (EPDCCH or/and PDCCH based) CSS method applied environment, or a PDCCH monitoring subframe set per cell (or component carrier) can be configured in order for a PDCCH monitoring subframe set of a scheduling cell to match a PDCCH monitoring subframe set of a scheduled cell].

For example, an EPDCCH monitoring subframe set per cell (or component carrier) can be configured in order for an EPDCCH monitoring subframe set of a scheduled cell to include an EPDCCH monitoring subframe set of a scheduling cell (e.g., SCell) in a carrier aggregation and (EPDCCH or/and PDCCH based) CSS method applied environment, or an EPDCCH monitoring subframe set per cell (or component carrier) can be configured in order for an EPDCCH monitoring subframe set of a scheduling cell to match an EPDCCH monitoring subframe set of a scheduled cell]. Moreover, according to the above-described embodiment of the present invention, a configuration related information or an information indicating whether to apply the configuration can be set to be notified to a user equipment by a base station through a predefined signal (e.g., a physical layer signal, an upper layer signal, etc.) or can be set to be implicitly obtained through a predefined configuration.

Therefore, if the configurations for the monitoring subframe set of the scheduling cell and the monitoring subframe set of the scheduled cell are applied in the carrier aggregation and (EPDCCH or/and PDCCH based) CSS method applied environment, a user equipment can receive a corresponding cell (i.e., SCell) related control information through a PDCCH (e.g., USS) monitoring operation on a scheduling cell at a timing point (e.g., subframe) at which EPDCCH on a scheduled cell (e.g., SCell) is not monitored. In particular, the reason for this is that if a specific timing point (e.g., subframe) is set to a subframe at which EPDCCH is not monitored in aspect of a scheduled cell (e.g., SCell), the corresponding timing point must be set to a subframe at which EPDCCH is not monitored (or a PDCCH monitoring subframe) in aspect of a scheduling cell.

According to the present invention, in a carrier aggregation applied environment, a base station and a user equipment can set a timing point (e.g., subframe), at which (EPDCCH or/and PDCCH based) CCS method setting is actually valid, to be defined (or redefined) through a predefined configuration. Moreover, a configuration related information for defining (or, redefining) the timing point at which the CCS method setting is actually valid or an information indicating whether to apply the configuration can be set to be notified to a user equipment by a base station through a predefined signal (e.g., a physical layer signal, an upper layer signal, etc.) or can be set to be implicitly obtained through a predefined configuration.

According to one embodiment for setting the timing point (e.g., subframe), at which the CCS method setting is actually valid, to be defined (or redefined), the timing point (e.g., subframe), at which (EPDCCH or/and PDCCH based) CSS method setting is actually valid, may be limited to a timing point (e.g., subframe) set for a scheduling cell and a scheduled cell to monitor a control channel (e.g., EPDCCH or/and PDCCH) of the same type Moreover, according to another embodiment for setting the timing point (e.g., subframe), at which the CCS method setting is actually valid, to be defined (or redefined), if an EPDCH based CCS method is not supported but a PDCCH based CCS method is supported only [hereinafter, CASE #1], if an EPDCCH based CCS method and a PDCCH based CCS method are defined as independent (different) CCS methods, respectively [CASE #2], or if an EPDCCH based CCS method and a PDCCH based CCS method are defined as one common CCS method [CASE #3], a timing point (e.g., subframe) at which a CCS method setting is actually valid may be set differently (or independently) based on a definition of the corresponding CCS method.

For example, in CASE #1, a timing point (e.g., subframe) at which a CCS method setting is actually valid is limited to a timing point (e.g., subframe) set for both a scheduling cell and a scheduled cell to monitor PDCCH. In case of the EPDCCH based CCS method of CASE #2, a timing point (e.g., subframe) at which a CCS method setting is actually valid is limited to a timing point (e.g., subframe) set for both a scheduling cell and a scheduled cell to monitor EPDCCH. In case of the PDCCH based CCS method of CASE #2, a timing point (e.g., subframe) at which a CCS method setting is actually valid is limited to a timing point (e.g., subframe) set for both a scheduling cell and a scheduled cell (e.g., SCell) to monitor PDCCH. In CASE #3, a PDCCH based CCS method is regarded as valid at a timing point (e.g., subframe) set for both a scheduling cell and a scheduled cell (e.g., SCell) to monitor PDCCH or an EPDCCH CCS method is regarded as valid at a timing point (e.g., subframe) set for both a scheduling cell and a scheduled cell to monitor EPDCCH.

According to a method for a CCS method setting to define (redefine) an actually valid timing point (e.g., subframe), a scheduling cell and a scheduled cell can set a cell (or component carrier) based self-scheduling method to be applied by a predefined configuration instead of a (EPDCCH or/and PDCCH based) CCS method (if a scheduling cell and a scheduled cell are set to monitor control channel (e.g., EPDCCH or/and PDCCH) of a different type at a specific timing point (e.g., subframe), or if a scheduling cell and a scheduled cell are set to monitor control channels of a predefined specific combination, respectively) at a specific timing point. For instance, at a specific timing point (e.g., subframe), if a scheduling cell is set as an EPDCCH based control channel monitoring subframe and a scheduled cell is set as a PDCCH based control channel monitoring subframe, a cell (or component carrier) based self-scheduling method is applied by a predefined configuration instead of an EPDCCH or/and PDCCH based CCS method.

Moreover, a configuration related information of the method for setting the CCS method setting to define (redefine) an actually valid timing point (e.g., subframe) or an information indicating whether to apply the configuration can be set to be notified to a user equipment by a base station through a predefined signal (e.g., a physical layer signal, an upper layer signal, etc.) or can be set to be implicitly obtained through a predefined configuration. In particular, in case that a cell (or component carrier) based self-scheduling method is applied, a user equipment is defined to (dynamically) receive a corresponding cell (or component carrier) related information depending on a monitored control channel type (e.g., EPDCCH or/and PDCCH) set at a specific timing point (e.g., subframe) on the corresponding cell (or component carrier) or may be defined to receive a corresponding cell (or component carrier) related control information semi-statically (or statically) based on a predefined specific control channel (e.g., EPDCCH or/and PDCCH) type.

According to the present invention, in a carrier aggregation applied environment, if settings for timing points (e.g., subframes) of monitoring EPDCCH per cell (or component carrier) or settings for subframes of monitoring PDCCH are not matched and a CCS method (EPDCCH or/and PDCCH based) is applied, a base station and a user equipment can be set to transmit/receive a specific cell (or component carrier) related control information based on a predefined configuration. Moreover, a configuration related information of transceiving a specific cell related control information according to the above-described embodiment of the present invention or an information indicating whether to apply the configuration can be set to be notified to a user equipment by a base station through a predefined signal (e.g., a physical layer signal, an upper layer signal, etc.) or can be set to be implicitly obtained through a predefined configuration.

For instance, a base station and a user equipment can be defined to receive a scheduled cell related control information through an EPDCCH (e.g., USS) monitoring operation on a corresponding cell (or component carrier) if a scheduled cell is set as an EPDCCH monitoring subframe at a specific timing point (e.g., subframe).

Moreover, if a scheduled cell is set as a subframe for not monitoring EPDCCH at a specific timing point (e.g., subframe) and it is unable to monitor PDCCH USS on a scheduling cell at the corresponding timing point, it is able to define an additional configuration for a scheduled cell related control information reception. In this case, a case of being unable to monitor PDCCH USS on a scheduling cell may include one of cases as follows. First of all, when a different UL-DL subframe configuration (UL-DL configuration) per cell (or component carrier) is applied, since a scheduling cell and a scheduled cell are set as a UL subframe and a DL subframe at a specific timing point, respectively, PDCCH USS on a scheduling cell does not exist. Secondly, since a scheduling cell is set as an EPDCCH monitoring subframe, candidates for USS related blind decoding (BD) do not exist on PDCCH channel (i.e., a case that USS related BD candidates exist on EPDCCH channel only). In this case, regarding a scheduled cell related control information, if a scheduled cell is set as a subframe for not monitoring EPDCCH at a specific timing point (e.g., subframe) and a scheduling cell is set as an EPDCCH monitoring subframe at the corresponding timing point (e.g., subframe) (i.e., CIF (carrier indicator field) does not exist on the corresponding EPDCCH), a scheduled cell related control information may be set to be received through a PDCCH (e.g., USS) monitoring operation on the scheduled cell (or component carrier) [i.e., a sort of a self-scheduling method applied]. Or/and, if a scheduled cell is set as a subframe for not monitoring EPDCCH at a specific timing point (e.g., subframe) and a scheduling cell is set as an EPDCCH monitoring subframe at the corresponding timing point (e.g., subframe) (i.e., CIF (carrier indicator field) exists on the corresponding EPDCCH), a scheduled cell related control information may be set to be received through an EPDCCH (e.g., USS) monitoring operation on the scheduling cell (or component carrier) [i.e., a sort of an EPDCCH based CSS method applied]. Moreover, if both a scheduling cell and a scheduled cell are set as subframes for not monitoring EPDCCH at a specific timing point (e.g., subframe), a scheduled cell related control information may be set to be received through a PDCCH (e.g., USS) monitoring operation on the scheduling cell (or component carrier) [i.e., a sort of a PDCCH based CCS method].

In addition, in a carrier aggregation applied environment, under the condition that settings for the timing points (e.g., subframes) of monitoring EPDCCH per cell (or component carrier) are not matched and the condition that (EPDCCH or/and PDCCH based) CCS method is applied, if a PDCCH/EPDCCH monitoring subframe set of a scheduling cell and a scheduled cell is configured, the scheduling cell at a PDCCH monitoring timing point (e.g., subframe) of the scheduled cell can be limitedly set as an EPDCCH monitoring subframe timing point (i.e., a case that CIF (carrier indicator field) exists on the corresponding EPDCCH) or the scheduling cell at the PDCCH monitoring timing point (e.g., subframe) of the scheduled cell can be limitedly set as a PDCCH monitoring subframe timing point (i.e., a case that CIF (carrier indicator field) exists on the corresponding PDCCH).

Likewise, in a carrier aggregation applied environment, under the condition that settings for the subframes of monitoring PDCCH per cell (or component carrier) are not matched and the condition that (EPDCCH or/and PDCCH based) CCS method is applied, if a PDCCH/EPDCCH monitoring subframe set of a scheduling cell and a scheduled cell is configured, the scheduling cell at a timing point (e.g., subframe) of not monitoring EPDCCH the scheduled cell can be limitedly set as an EPDCCH monitoring subframe timing point (i.e., a case that CIF (carrier indicator field) exists on the corresponding EPDCCH) or the scheduling cell at the timing point (e.g., subframe) of not monitoring the EPDCCH of the scheduled cell can be limitedly set as a PDCCH monitoring subframe timing point (i.e., a case that CIF (carrier indicator field) exists on the corresponding PDCCH).

In addition, the application of the above-described embodiment that the scheduling cell is limitedly set as a PDCCH monitoring timing point (e.g., subframe) at a PDCCH monitoring timing point (e.g., subframe) of the scheduled cell or at a timing point (e.g., subframe) of not monitoring EPDCCH may be limited to a case that the scheduling cell is set for the DL subframe usage at the corresponding timing point [i.e., applicable in a situation that a different DL-UL subframe configuration is applied per cell (or component carrier)].

According to the present invention, in a carrier aggregation and (EPDCCH or/and PDCCH based) CCS method applied environment, when a different DL-UL subframe configuration is set per cell (or component carrier), a scheduling cell (or scheduling component carrier) and a scheduled cell (or scheduled component carrier) can be assumed as set as a UL subframe and a DL subframe, respectively. On this assumption, if the scheduled cell is set as an EPDCCH monitoring subframe at a corresponding timing point, a base station and a user equipment can be set to perform a UL/DL data transmitting/receiving operation on the scheduled cell based on an EPDCCH (e.g., USS) monitoring operation on the scheduled cell (or scheduled component carrier) by a predefined configuration [i.e., this may be interpreted as an operation to which a sort of a self-scheduling method is applied exceptionally]. Likewise, if the scheduled cell is set as a PDCCH monitoring subframe at a corresponding timing point, a base station and a user equipment may be set to perform a UL/DL data transmitting/receiving operation on the scheduled cell based on a PDCCH (e.g., USS) monitoring operation on the scheduled cell (or scheduled component carrier) by a predefined configuration.

Moreover, in case that a different UL-DL subframe configuration per cell (or component carrier) is set, a configuration related information of the embodiment of the present invention or an information indicating whether to apply the configuration can be set to be notified to a user equipment by a base station through a predefined signal (e.g., a physical layer signal, an upper layer signal, etc.) or can be set to be implicitly obtained through a predefined configuration.

According to the present invention, in a carrier aggregation and (EPDCCH or/and PDCCH based) CCS method applied environment, when a different DL-UL subframe configuration is set per cell (or component carrier), a base station and a user equipment can assume a UL/DL HARQ timeline related to UL/DL data scheduled on a specific cell (or component carrier) based on a predefined configuration. Moreover, a UL/DL HARQ timeline information related to UL/DL data scheduled on a specific cell (or component carrier) or an information indicating whether to apply the configuration can be set to be notified to a user equipment by a base station through a predefined signal (e.g., a physical layer signal, an upper layer signal, etc.) or can be set to be implicitly obtained through a predefined configuration.

For clarity of the foregoing description, the configuration applied situations are assumed as follows. First of all, if a scheduled cell is set as an EPDCCH monitoring subframe at a specific timing point (e.g., subframe), a base station and a user equipment are set to receive a scheduled cell related control information through an EPDCCH (e.g., USS) monitoring operation on the corresponding scheduled cell (or component carrier) [i.e., a sort of a self-scheduling method applied]. Secondly, if a scheduled cell is set as a subframe for not monitoring EPDCCH at a specific timing point (e.g., subframe), a base station and a user equipment can be set to receive a scheduled cell related control information through (EPDCCH or/and PDCCH based) CCS method on a scheduling cell (or component carrier) [i.e., a sort of an EPDCCH or/and PDCCH based CSS method applied]. In particular, assumed is the situation that a scheduled cell (or component carrier) related control information is dynamically received through an (EPDCCH or/and PDCCH based) CCS method on a scheduling cell (or component carrier) or a self-scheduling method on a scheduled cell depending on a timing point (e.g., subframe) change in aspect of a specific user equipment.

In the following description, a UL/DL HARQ timeline related to UL/DL data scheduled on a scheduled cell is defined. In a carrier aggregation and (EPDCCH or/and PDCCH based) CCS method applied environment, the UL/DL HARQ timeline applying method defined in the following can be extensively applied to a case of applying the same UL-DL subframe configuration (UL-DL configuration) per cell (or component carrier) (partially or entirely) or a case of differently defining configurations for subframes of monitoring EPDCCH per cell (or component carrier) and can be extensively applied to a case of differently defining configurations for subframes of monitoring PDCCH as well. Moreover, in a carrier aggregation and (EPDCCH or/and PDCCH based) self-scheduling method applied environment, the UL/DL HARQ timeline applying method defined in the following can be extensively applied to a case of applying the same UL-DL subframe configuration (UL-DL configuration) per cell (or component carrier) (partially or entirely) or a case of differently defining configurations for subframes of monitoring EPDCCH per cell (or component carrier), and can be extensively applied to a case of differently defining configurations for subframes of monitoring PDCCH as well.

In the following, described is a DL HARQ timeline related to DL data scheduled on a scheduled cell applied to the present invention (e.g., UL ACK/NACK transmission timeline interworking with PDSCH received at a specific timing point).

1.1 Method of Applying a DL HARQ Timeline of a Different Type Depending on a Method of Receiving a Scheduled Cell Related Control Information If a scheduled cell related control information is received through an EPDCCH (e.g., USS) monitoring operation on a corresponding scheduled cell (or scheduled component carrier), a DL HARQ timeline related to DL data scheduled on the scheduled cell can be set to follow a DL HARQ timeline of a representative UL-DL subframe configuration (i.e., a self-scheduling based DL HARQ timeline) having a DL subframe set matching or closest to a union of a DL subframe set of a PCell (primary cell) (or a DL subframe set of a scheduling cell or a DL subframe set of a scheduling component carrier) and a DL subframe set of a scheduled cell (or scheduled component carrier). In this case, an uplink (UL) ACK/NACK related to DL data scheduled on a scheduled cell may be set to be transmitted through a UL subframe of a PCell (primary cell) in accordance with a DL HARQ timeline of the representative UL-DL subframe configuration or through a UL subframe of a predefined specific cell (or component carrier) (e.g., SCell).

If a scheduled cell related control information is received through an (EPDCCH or/and PDCCH based) CCS method on a scheduling cell (or scheduled component carrier), a DL HARQ timeline related to DL data scheduled on a scheduled cell can be set to follow a DL HARQ timeline of PCell (primary cell) [i.e., a CCS based DL HARQ timeline].

If a scheduled cell related control information is received through an (EPDCCH or/and PDCCH based) CCS method on a scheduling cell (or scheduled component carrier), a DL HARQ timeline related to DL data scheduled on a scheduled cell may be set to follow a DL HARQ timeline of a representative UL-DL subframe configuration having a DL subframe set matching or closest to a union of a DL subframe set of a PCell (primary cell) (or a DL subframe set of a scheduling cell or component carrier) and a DL subframe set of a scheduled cell (or scheduled component carrier). In this case, a UL ACK/NACK related to DL data scheduled on a scheduled cell can be set to be transmitted through a UL subframe of a PCell (primary cell) in accordance with a DL HARQ timeline of PCell (primary cell) or a DL HARQ timeline of the representative UL-DL subframe configuration or through a UL subframe of a predefined specific cell (or component carrier).

1.2 Method of Applying a Predefined Common DL HARQ Timeline Irrespective of a Method of Receiving a Scheduled Cell Related Control Information Assume a case that a scheduled cell related control information is received through an EPDCCH (e.g., USS) monitoring operation on a corresponding scheduled cell (or scheduled component carrier) or through an (EPDCCH or/and PDCCH based) CCS method on a scheduling cell (or component carrier). In this case, a DL HARQ timeline related to DL data (scheduled) on the scheduled cell can be set to follow a DL HARQ timeline of a representative UL-DL subframe configuration (i.e., a self-scheduling based DL HARQ timeline) having a DL subframe set matching or closest to a union of a DL subframe set of a PCell (primary cell) (or a DL subframe set of a scheduling cell or a DL subframe set of a scheduling component carrier)) and a DL subframe set of a scheduled cell (or scheduled component carrier). Alternatively, in the above-mentioned case, a DL HARQ timeline related to DL data scheduled on a scheduled cell may be set to follow a DL HARQ timeline of PCell (primary cell) [i.e., a CCS based DL HARQ timeline].

In this case, for example, a UL ACK/NACK related to DL data scheduled on a scheduled cell can be set to be transmitted through a UL subframe of a PCell (primary cell) in accordance with a DL HARQ timeline of PCell (primary cell) or a DL HARQ timeline of the representative UL-DL subframe configuration or through a UL subframe of a predefined specific cell (or component carrier) (e.g., SCell).

1.3 Method of Transmitting UL ACK/NACK if a DL HARQ Timeline Related to DL Data Scheduled on a Scheduled Cell is Defined Uplink (UL) ACK/NACK related to DL data scheduled on a scheduled cell can be transmitted through a UL subframe of a PCell (primary cell), a predefined specific cell (e.g., SCell) or a component carrier in accordance with a specific DL HARQ timeline. And, at least one of an information related to a bit configuration (e.g., ACK, NACK, DTX) of UL ACK/NACK transmitted through a UL subframe of a specific timing point of PCell (primary cell), a predefined specific cell (e.g., SCell) or a component carrier and an information related to a PUCCH format type (e.g., PUCCH Format 1a/1b, PUCCH format 1b with Channel Selection, PUCCH Format 3) used for the corresponding UL ACK/NACK transmission can be determined in a manner of considering a DL HARQ timeline of PCell (primary cell), a predefined specific cell (e.g., SCell)) or a component carrier and a DL HARQ timeline of a representative UL-DL subframe configuration derived from the above-described configurations of the scheduled cell together.

For instance, a DL HARQ timeline related to DL data scheduled on a scheduled cell can be defined as a DL HARQ timeline of a representative UL-DL subframe configuration having a DL subframe set matching or closest to a union of a DL subframe set of a PCell (primary cell) and a DL subframe set of a scheduled cell (or scheduled component carrier). In this case, at least one of a bit configuration of UL ACK/NACK transmitted through a UL subframe at a specific timing point of PCell (primary cell) and a PUCCH format type used for the corresponding UL ACK/NACK transmission can be determined by the total (or maximum) number of DL subframes on PCell (primary cell) and scheduled cell interworking with UL subframe at the corresponding timing point in consideration of the DL HARQ timeline of the PCell (primary cell) and the DL HARQ timeline of the representative UL-DL subframe configuration derived from the above-described configurations of the scheduled cell.

In this case, for one additional example, the number of DL subframes on a scheduled cell interworking with UL subframe at a specific timing point of a PCell (primary cell) may be set to be determined in consideration of the DL HARQ timeline of the representative UL-DL subframe configuration derived from the above-described configurations and DL subframes capable of performing actually valid DL data transmission (based on a CCS method or/and a self-scheduling method) on the corresponding scheduled cell only.

For another example, the number of DL subframes on a scheduled cell interworking with UL subframe at a specific timing point of a PCell (primary cell) may be determined in consideration of the DL HARQ timeline of the representative UL-DL subframe configuration derived from the above-described configurations only. Namely, the number of DL subframes interworking with UL subframe at a specific timing point may be determined based on the DL HARQ timeline defined for the corresponding scheduled cell only or the DL HARQ timeline defined for the scheduled component carrier only.

In the following, described are UL HARQ timelines related to UL data (scheduled) on a scheduled cell (e.g., a UL control information (e.g., UL Grant) reception timeline, a PUSCH transmission timeline interworking with UL control information (UL Grant) received at a specific timing point, a PHICH reception timeline interworking with PUSCH transmitted at a specific timing point).

2.1 Method of Applying a DL HARQ Timeline of a Different Type Depending on a Method of Receiving a Scheduled Cell Related Control Information If a scheduled cell related control information is received through an EPDCCH (e.g., USS) monitoring operation on a corresponding scheduled cell (or scheduled component carrier), a UL HARQ timeline related to UL data scheduled on the scheduled cell can be set to follow a UL HARQ timeline of a UL HARQ timeline of the scheduled cell (or scheduled component carrier) [i.e., a self-scheduling based UL HARQ timeline]. In this case, for example, a PHICH information related to UL data scheduled on a scheduled cell may be set to be received in a DL subframe on a scheduled cell (or scheduled component carrier) in accordance with a UL HARQ timeline of the scheduled cell (or scheduled component carrier) or in a DL subframe on a preset scheduling cell (or scheduling component carrier), or the corresponding PHICH reception operation may be set to be omitted [i.e., a user equipment transmits ACK information to its upper layer].

If a scheduled cell related control information is received through an (EPDCCH or/and PDCCH based) CCS method on a scheduling cell (or scheduling component carrier), a UL HARQ timeline related to UL data scheduled on a scheduled cell can be set to follow a UL HARQ timeline of PCell (primary cell) [i.e., a CCS based UL HARQ timeline]. Alternatively, if a scheduled cell related control information is received through a CCS method on a scheduling cell (or scheduling component carrier), a UL HARQ timeline related to UL data scheduled on a scheduled cell can be set to follow a UL HARQ timeline of a representative UL-DL subframe configuration having a DL subframe set matching (or closest to) a union of a DL subframe set of a scheduling cell (or scheduling component carrier)) and a DL subframe set of a scheduled cell (or scheduled component carrier). Moreover, a PHICH information related to UL data scheduled on a scheduled cell can be set to be received in a DL subframe of a scheduled cell (or scheduled component carrier) in accordance with a UL HARQ timeline of PCell (primary cell) or a UL HARQ timeline of the representative UL-DL subframe configuration or in a DL subframe on a predefined scheduling cell (or scheduling component carrier), or the corresponding PHICH reception operation may be set to be omitted [i.e., a user equipment transmits ACK information to its upper layer].

2.2 Method of Applying a Predefined Common UL HARQ Timeline Irrespective of a Method of Receiving a Scheduled Cell Related Control Information It is able to assume a case that a scheduled cell related control information is received through an EPDCCH (e.g., USS) monitoring operation on a corresponding scheduled cell (or scheduled component carrier) or through an (EPDCCH or/and PDCCH based) CCS method on a scheduling cell (or scheduling component carrier). In this case, a UL HARQ timeline related to UL data scheduled on the scheduled cell can be set to follow a UL HARQ timeline of a scheduled cell (or scheduled component carrier) [i.e., a self-scheduling based UL HARQ timeline]. Alternatively, a UL HARQ timeline related to UL data scheduled on the scheduled cell can be set to follow a UL HARQ timeline of PCell (primary cell) [i.e., a CCS based UL HARQ timeline]. In addition, a UL HARQ timeline related to UL data scheduled on the scheduled cell may be set to follow a UL HARQ timeline of a representative UL-DL subframe configuration having a DL subframe set matching or closest to a union of a DL subframe set of a scheduling cell (or scheduling component carrier)) and a DL subframe set of a scheduled cell (or scheduled component carrier).

In this case, for example, a PHICH information related to UL data scheduled on a scheduled cell may be set to be received in a DL subframe of a scheduled cell (or scheduled component carrier) in accordance with one of a UL HARQ timeline of a scheduled cell (or scheduled component carrier), a UL HARQ timeline of PCell (primary cell) and a UL HARQ timeline of the representative UL-DL subframe configuration or in a DL subframe on a predefined scheduling cell (or scheduling component carrier), or the corresponding PHICH reception operation may be set to be omitted [i.e., a user equipment transmits ACK information to its upper layer].

In a carrier aggregation and (EPDCCH or/and PDCCH based) CCS method applied environment, when a different UL-DL subframe configuration is set per cell (or component carrier), UL/DL HARQ timelines related to UL/DL data scheduled on a scheduled cell at a specific timing point (e.g., subframe) can be set in a manner of being independent from each other. Moreover, an independent UL/DL HARQ timeline information related to UL/DL data scheduled on a scheduled cell or an information indicating whether to apply the configuration can be set to be notified to a user equipment by a base station through a predefined signal (e.g., a physical layer signal, an upper layer signal, etc.) or can be set to be implicitly obtained through a predefined configuration For example, a DL HARQ timeline related to DL data scheduled on a scheduled cell at a specific timing point (e.g., subframe) can be set to follow a DL HARQ timeline of PCell (primary cell) [i.e., a CCS based DL HARQ timeline] and a UL HARQ timeline related to UL data scheduled on a scheduled cell at the corresponding timing point (e.g., subframe) can be set to follow a UL HARQ timeline of the scheduled cell [i.e., a self-scheduling based UL HARQ timeline].

According to the embodiment for the above-described HARQ timeline application, a base station and a user equipment can assume UL/DL HARQ timeline related to UL/DL data scheduled on a specific cell (or component carrier) based on a predefined configuration. Moreover, a UL/DL HARQ timeline information related to UL/DL data scheduled on a specific cell (or component carrier) or an information indicating whether to apply the configuration can be set to be notified to a user equipment by a base station through a predefined signal (e.g., a physical layer signal, an upper layer signal, etc.) or can be set to be implicitly obtained through a predefined configuration.

The above-described embodiments of the present invention are extensively applicable to a case of performing a specific control channel (e.g., PDCCH, EPDCCH) based USS or CSS monitoring operation.

The above-described embodiments of the present invention may be applicable to a case that the CSS monitored by a user equipment may be assumed as existing on an existing PDCCH channel or a newly defined EPDCCH channel.

In addition, according to the above-described embodiments of the present invention, UL/DL data scheduled on PCell (primary cell) or, a predefined scheduling cell may be assumed as following a UL/DL HARQ timeline defined for the corresponding cell (or component carrier).

The above-described embodiments of the present invention are extensively applicable to a case of applying an assumption that CIF filed exists or does not exist on EPDCCH channel. Moreover, according to the above-described embodiments of the present invention, CIF field may be assumed as existing on EPDCCH channel transmitted on a predefined specific cell (e.g., PCell, a predefined scheduling cell (e.g., SCell)) (or component carrier) only.

The aforementioned various embodiments of the present invention can be implemented independently. Occasionally, although the at least one or more embodiments of the present invention are implemented in a manner of being combined in part or entirely, they are apparently included in the scope of the technical solution means proposed by the present invention.

Figure 13:
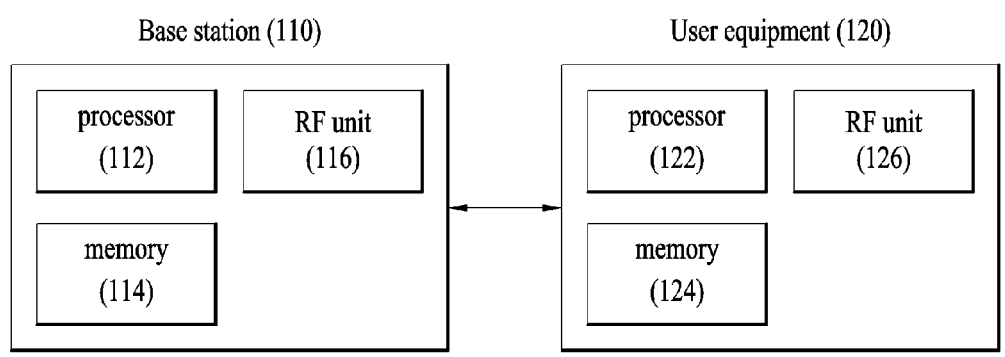
FIG. 13 shows one example of a base station and a user equipment applicable to an embodiment of the present invention.

FIG. 13 shows one example of a base station and a user equipment applicable to an embodiment of the present invention. If a relay is included in a wireless communication system, a communication in backhaul link is performed between a base station and a relay. And, a communication in access link is performed between a relay and a user equipment. Hence, the base station or user equipment shown in the drawing may be substituted with a relay in some cases.

The aforementioned various embodiments of the present invention can be implemented independently. Occasionally, although the at least one or more embodiments of the present invention are implemented in a manner of being combined in part or entirely, they are apparently included in the scope of the technical solution means proposed by the present invention.

Referring to FIG. 13, a wireless communication system includes a base station (BS) 110 and a user equipment (UE) 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of informations related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of detecting a control information in a wireless communication system and apparatus therefor are described mainly with reference to examples applied to 3GPP LTE system, as mentioned in the foregoing description, the present invention is applicable to various kinds of wireless communication systems as well as to the 3GPP LTE system.

What is claimed is:

1. A method of receiving a control information by a user equipment in a wireless communication system supportive of a carrier aggregation system, the method comprising:
identifying, by the user equipment, an Enhanced Physical Downlink control channel (EPDCCH) monitoring subframe set and a Physical Downlink control channel (PDCCH) monitoring subframe set for a primary cell;
identifying, by the user equipment, an EPDCCH monitoring subframe set and a PDCCH monitoring subframe set for a secondary cell; and
receiving, by the user equipment, control information for the secondary cell at a specific subframe through one of the primary cell and the secondary cell based on a control channel type for the primary cell and a control channel type for the secondary cell,
wherein if the user equipment is configured to monitor control channels of an identical control channel type for the primary cell and the secondary cell at the specific subframe, the control information for the secondary cell is received via the primary cell, and
wherein if the user equipment is configured to monitor an EPDCCH for the primary cell and to monitor a PDCCH for the secondary cell at the specific subframe, the control information for the secondary cell is received via the secondary cell.

2. The method of claim 1, wherein the secondary cell is configured in a manner that a downlink hybrid automatic repeat request (HARQ) set differently in accordance with a type of a control channel for receiving monitoring information is applied.

3. The method of claim 1, wherein the secondary cell is configured in a manner that a predefined downlink hybrid automatic repeat request (HARQ) is applied.

4. The method of claim 1, wherein the secondary cell is configured in a manner that an uplink hybrid automatic repeat request (HARQ) set differently in accordance with a type of a control channel for receiving monitoring information is applied.

5. The method of claim 1, wherein the secondary cell is configured in a manner that a predefined uplink hybrid automatic repeat request (HARQ) is applied.

6. The method of claim 1, wherein the control channel type is either the EPDCCH or the PDCCH.

7. A user equipment for receiving a control information in a wireless communication system supportive of a carrier aggregation system, the user equipment comprising:
a radio frequency (RF) unit; and
a processor operably coupled with the RF unit,
wherein the processor is configured to:
identify an Enhanced Physical Downlink control channel (EPDCCH) monitoring subframe set and a Physical Downlink control channel (PDCCH) monitoring subframe set for a primary cell;
identify an EPDCCH monitoring subframe set and a PDCCH monitoring subframe set for a secondary cell; and
receive control information for the secondary cell at a specific subframe through one of the primary cell and secondary cell, based on a control channel type for the primary cell and a control channel type for the secondary cell,
wherein if the user equipment is configured to monitor control channels of an identical control channel type for the primary cell and the secondary cell at the specific subframe, the control information for the secondary cell is received via the primary cell, and
wherein if the user equipment is configured to monitor an EPDCCH for the primary cell and to monitor a PDCCH for the secondary cell at the specific subframe, the control information for the secondary cell is received via the secondary cell.

8. The user equipment of claim 7, wherein the secondary cell is configured in a manner that a downlink hybrid automatic repeat request (HARQ) set differently in accordance with a type of a control channel for receiving monitoring information is applied.

9. The user equipment of claim 7, wherein the secondary cell is configured in a manner that a predefined downlink hybrid automatic repeat request (HARQ) is applied.

10. The user equipment of claim 7, wherein the secondary cell is configured in a manner that an uplink hybrid automatic repeat request (HARQ) set differently in accordance with a type of a control channel for receiving monitoring information is applied.

11. The user equipment of claim 7, wherein the secondary cell is configured in a manner that a predefined uplink hybrid automatic repeat request (HARD) is applied.

12. The user equipment of claim 7, wherein the control channel type is either the EPDCCH or the PDCCH.

* * * * *